Fig. 1.

INVENTORS.
VASIL GEORGEFF
THEODORE F. NOVAK
RICHARD D. FROULA
BY
Wolfe, Hubbard, Voit + Osann
ATTORNEYS.

United States Patent Office 3,404,789
Patented Oct. 8, 1968

3,404,789
DESTACKING APPARATUS
Vasil Georgeff, La Grange, Theodore F. Novak, La Grange Park, and Richard D. Froula, Brookfield, Ill., assignors to Danly Machine Specialties, Inc., Chicago, Ill., a corporation of Illinois
Filed July 14, 1966, Ser. No. 565,306
19 Claims. (Cl. 214—8.5)

ABSTRACT OF THE DISCLOSURE

Apparatus for removing metal sheets from a stack with vertically reciprocating vacuum pick-ups, magnetically receiving and supporting the sheet raised from the stack and automatically transferring the individual supported workpiece to a power press line or the like wherein the destacking and transfer operations occur synchronized with the press and press transfer equipment for high speed, continuous operation.

Destacking apparatus of the foregoing type wherein multiple palletized stacks of sheets are moved through the destacker with continuous control for separating sheets from the stacks being fed into the apparatus.

---

The present invention relates generally to apparatus for individually separating sheet material from stacks and, more particularly, to apparatus for removing individual sheets from a stack and transferring the individually removed sheets in a continuous manner. In its principal aspect, the invention is concerned with improved apparatus for removing sheet metal blanks or workpieces from a stack and automatically transferring the individual separated workpieces to a power press line or the like, yet wherein the destacking and transfer occurs synchronized with the presses and press transfer equipment for high speed, continuous operation.

A power press line of the type that may be advantageously utilized with the apparatus of the present invention is described and claimed in James C. Danly, U.S. Patent 3,199,443 issued Aug. 10, 1965, and assigned to the assignee of the present invention. Thus, there is disclosed and claimed in the aforesaid Danly patent a press line having provision for synchronizing all of the press line functions, including an automatic transfer mechanism for transport of the workpiece down the line, permitting the press to run in the "continuous" mode at high speed. Such application further discloses a press line in which a series of power presses are provided with conveyors extending from one to the next with each press having a transfer mechanism for loading a workpiece from the input side of the conveyor into the press work area and a second transfer mechanism for unloading the workpiece from the work area to the conveyor at the output side in which the transfer devices and adjacent conveyor are kept in synchronization with a press slide by a positive and direct mechanical coupling with adjacent presses synchronized by a control circuitry described and claimed in James C. Danly U.S. Patent 3,199,439 issued Aug. 10, 1965.

While as can be seen from the aforementioned patents, power press lines have become automated with continuous high speed operation, the initial loading of sheet metal blanks or workpieces has not heretofore been effectively accomplished by apparatus positively and directly coupled to a press line for synchronized, high speed, continuous operation.

Accordingly, it is a general aim of the present invention to provide a novel destacking apparatus for feeding individual sheets removed from a stack one-by-one to the input of a power press or the like. While not so limited in its application, the invention will find especially advantageous use in destacking and feeding sheets individually to the input of an automated line of presses.

It is another object of the invention to provide a destacking apparatus integrated with a power press and capable of removing sheets from a stack and individually feeding the sheets to the input of a press synchronized with the press functions to permit the press to run in continuous mode at high speed.

It is another object of the invention in one of its aspects to provide a destacker apparatus which reliably separates individual sheets from a stack and insures proper positioning of the sheets for passage to the input of a press.

It is another object of the present invention to provide an improved destacking apparatus for individually feeding workpieces to a press line or the like characterized by its versatility and which readily permits effective use with multiple stacks of sheets which may vary in size from other stacks being fed into the apparatus without any need for changeover and even wide variances in sheet size may be simply accommodated with only minor adjustments being necessary. In this connection, it is an object to provide a reliable destacking apparatus particularly suitable for use in mass production operations.

Yet another important aspect of the present invention is to provide an improved destacking apparatus which insures that only one sheet at a time is fed into a press input thereby avoiding breakdowns or costly down time should more than one sheet be picked up from the stack due to sticking or other conditions that may cause clinging of sheets to one another.

It is a more specific object of the invention to provide an improved destacking apparatus which includes vertically reciprocating vacuum cups to pick up the top most sheet of a stack and which utilizes a magnetic separation for reducing the likelihood that sheets will stick together as will readily occur solely by using a magnetic pick-up. In this connection it is an object to provide an apparatus of the above type which alines a sheet picked up from the stack before feeding it to the input of a press.

It is still another object of the present invention to provide a destacking apparatus which incorporates sensing means throughout the machine for insuring proper operation with a minimum of maintenance required.

Other objects and advantages of the invention will become apparent upon reading the attached detailed description and upon reference to the drawings, in which:

FIGURE 1 is a side elevation, partly diagrammatic, showing a destacking apparatus embodying the features of the present invention, such apparatus here shown as it is coupled with a loading arm trolley shown in phantom for a power press or the like;

While the invention is susceptible of various modifications and alternative forms, an illustrative embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

Figure 1:
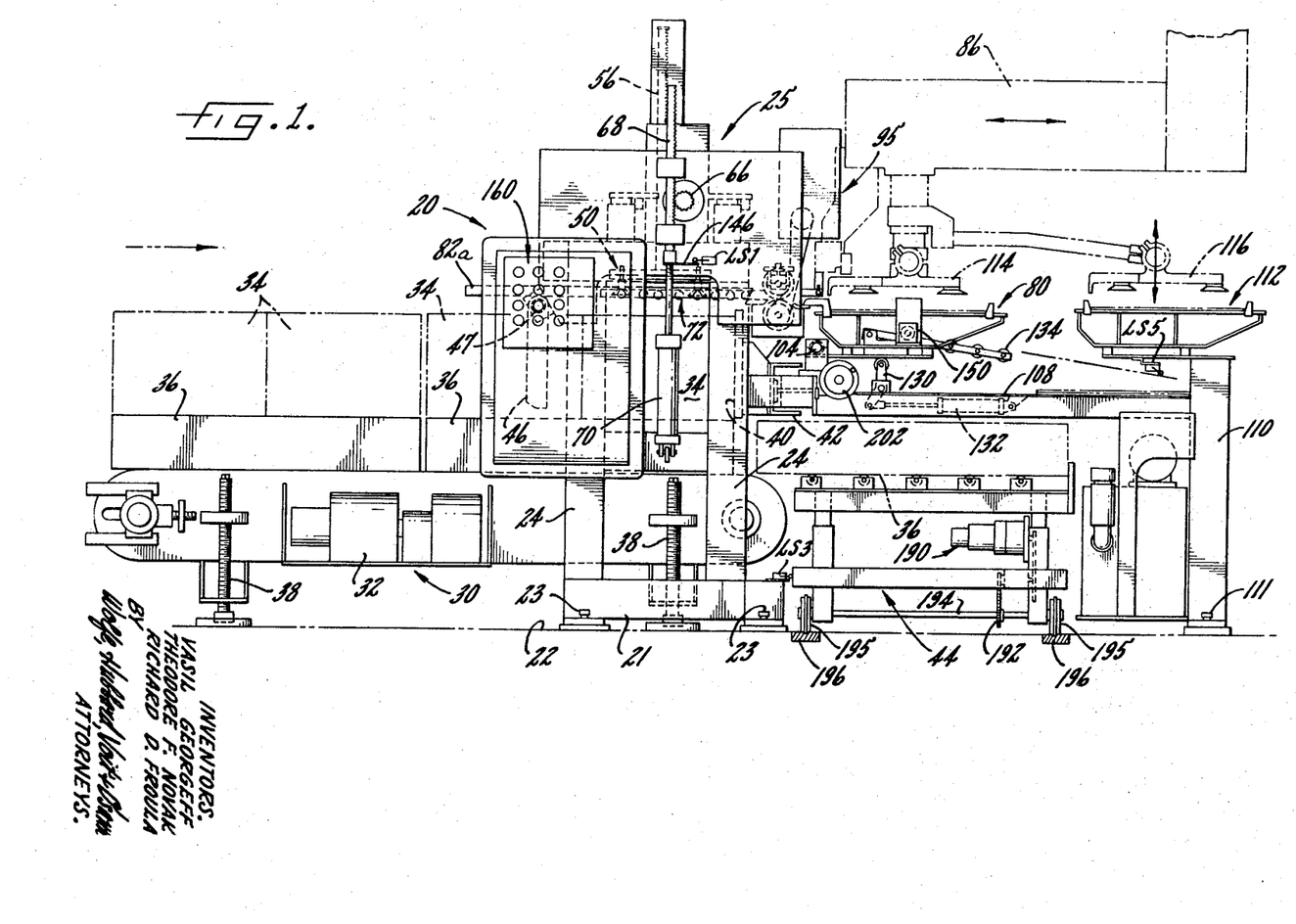

Referring now to the drawings, and particularly to FIG. 1, there is illustrated an exemplary destacking apparatus, generally indicated at 20, which is particularly suited for removing individual sheets or blanks from a stack and feeding them one-by-one to the input of a press or automatic press line in accordance with the present invention. As is best shown in FIG. 1, the exemplary apparatus 20 includes a base 21 adapted to be bolted or otherwise secured to floor 22 by bolts 23. Secured to the base are two pairs of spaced upwardly extending columns 24 which are topped by a crown 25 thus forming the main frame of the apparatus.

In order to supply a quantity of stacked metal sheets or blanks to the apparatus, there is provided a free standing conveyor mechanism 30 which extends into the rear of apparatus 20 between opposed pairs of upstanding columns 24. The conveyor 30 which is of the endless "belt" type, operated by motor drive arrangement 32 carries stacks of sheet metal blanks 34 loaded on pallets 36. Screw-type jacks 38 are mounted to the conveyor 30 for leveling the conveyor and palletized stacks with respect to the apparatus 20.

Figure 3:
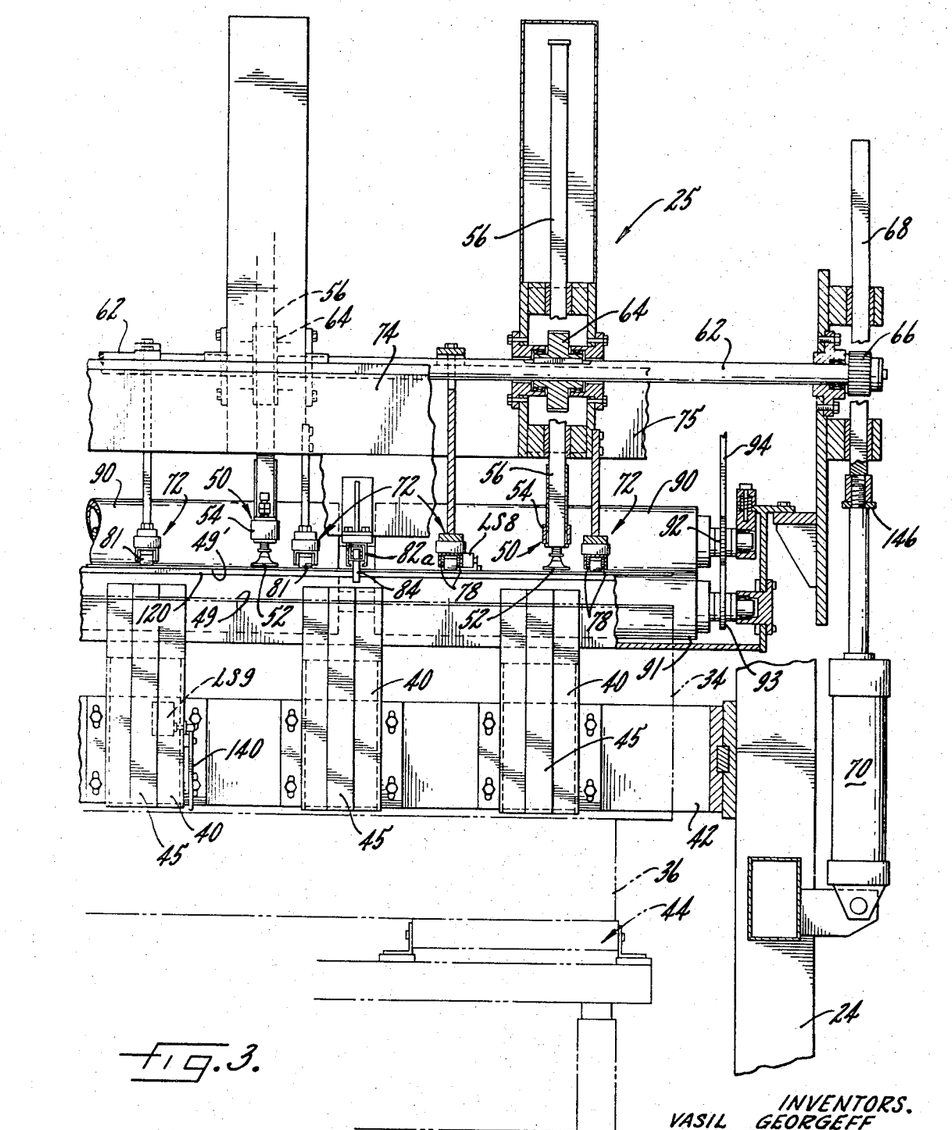
FIG. 3 is a fragmentary transverse sectional view taken substantially along the line 3—3 in FIG. 2.

The palletized stacks of blanks loaded onto the conveyor in any suitable manner are conveyed toward the apparatus 20 until the leading edge of the first palletized stack abuts against a plurality of vertically oriented stop blocks 40. Referring to FIGS. 1 and 3, conjointly, the stop blocks 40 are horizontally spaced from one another and secured to a horizontally extending frame member 42 which spans upstanding columns 24 on opposite sides of the machine. The blocks 40 are spaced vertically with respect to the conveyor so as to permit the pallet 36 to pass on through the machine onto a wheeled cart 44.

Figure 5:
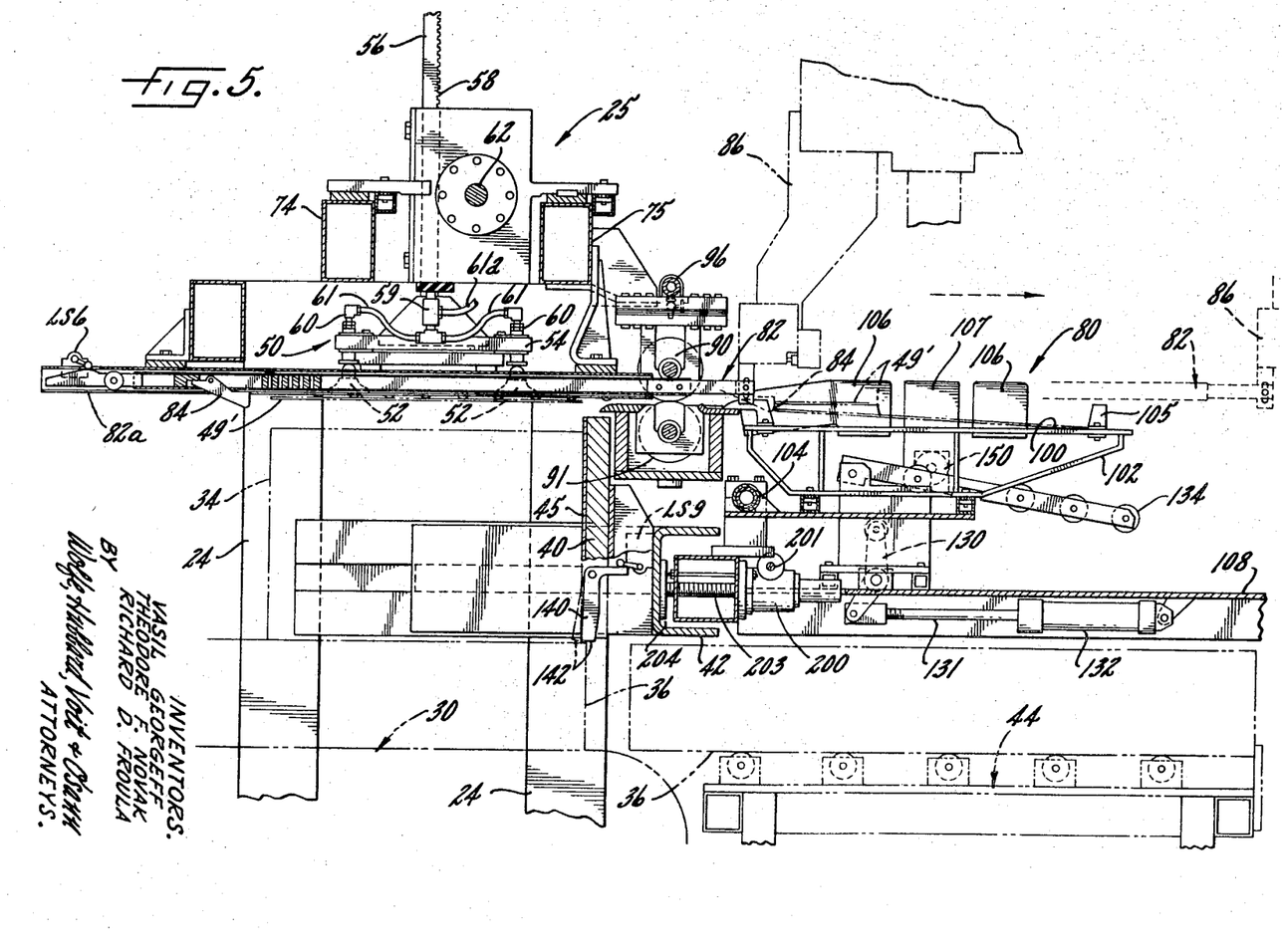
FIG. 5 is a fragmentary sectional view taken substantially along the line 5—5 in FIG. 2.

When the stack 34 is moved into the machine until it strikes the stop blocks 40, the leading edges of the stacked sheets will tend to be rebounded or moved into squared alignment against the stop blocks. In order to further insure that the sheets are in horizontal alignment, the stop blocks include a frame having strips of magnetic material 45 and wearstrips are secured from the front edges (FIG. 5). For the purpose of insuring that the stacks are centered on the conveyor, there is provided a pair of adjustable spaced arms 46 (as viewed in FIGS. 1 and 2) which are mounted on a transverse rod 47. The arms allow for a visual centering of the stacks on the conveyor.

In accordance with the present invention, the apparatus 20 is equipped with vertically reciprocating vacuum pick-ups 50 to pick up the top most sheet, indicated at 49, of stack 34 and also includes a magnetic separating means for reducing any likelihood that multiple sheets will be initially picked up.

Figure 4:
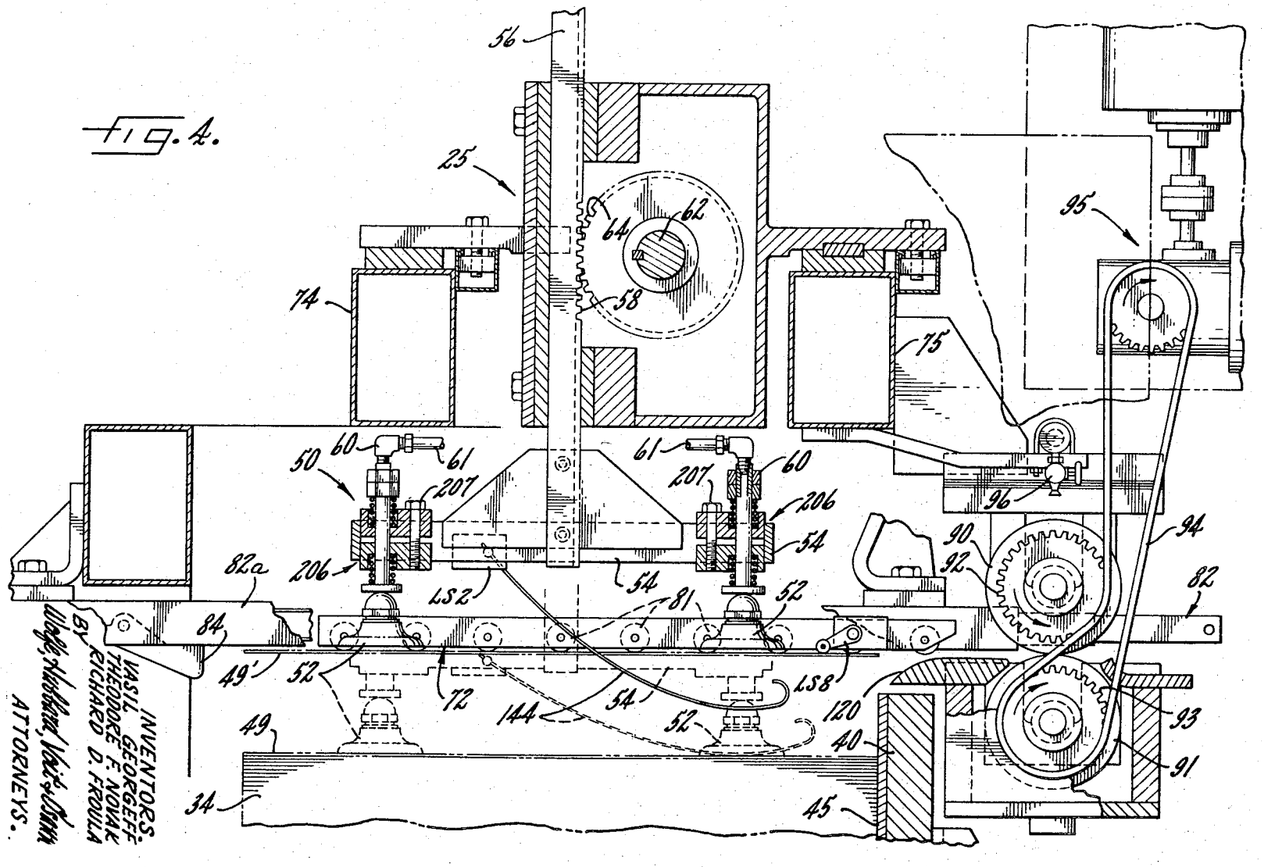
FIG. 4 is a fragmentary sectional view taken substantially along the line 4—4 in FIG. 2.

Referring to FIGS. 3 and 4, conjointly, the vacuum pick-up means 50 includes a plurality of pairs of transversely spaced vacuum cups 52 reciprocatingly mounted in crown 25 of the apparatus. In the illustrative embodiment of the invention as illustrated in FIG. 4, each vacuum pick-up 50 is in the form of a horizontally extending arm 54 with a vacuum cup 52 mounted adjacent each end of the arm. Arm 54 is centrally connected to a vertical bar 56 which includes a rack 58 formed along one surface thereof. For the purpose of creating a suction at the interface of cup 52 and the topmost sheet of the stack, there are provided suitable fittings 60 and lines 61 leading to a source of vacuum (not shown), through a vacuum transducer 59 and lines 61a.

In carrying out the present invention, the vacuum pick-ups 50 are reciprocated in unison so that they travel downwardly until engaging the topmost sheet 49 of the stack 34 beneath the pickups and after such engagement, the pickups are raised upwardly together with the topmost sheet which is held by suction cups 52. To accomplish this reciprocating movement, a transverse shaft 62 mounted in crown 25 of the apparatus carries a plurality of spur gears 64 which mesh with the racks 58 of bars 56. In order to rotate shaft 62 for raising and lowering the pickup heads, a drive gear 66 suitably keyed to the shaft 62 (FIG. 3) meshes with a reciprocating rack member 68 driven by a double acting servo cylinder 70.

In accordance with another of the important aspects of the present invention, provision is made for releasing the sheet picked up by the vacuum pick-ups when the latter has been raised to an uppermost position in the machine, while at the same time holding the sheet magnetically suspended to facilitate transfer of the sheet in a horizontal position. To this end, and as best shown by reference to FIGS. 3 and 6, conjointly, a plurality of magnetic rails 72 are suspended at axially extending and spaced intervals across transverse members 74, 75 of crown 25. The rails 72 are arranged so that the vacuum pick-up heads pass between spaced pairs of rails, with the heads moving upwardly, sufficiently beyond the rails so as to effect dislodgement of the sheet from the cups.

Each of the rails 72 comprises a pair of axially extending pole pieces 78 (FIG. 3) with a plurality of block-shaped magnetic elements 79 at spaced intervals along the pole pieces. Disposed within the spaces between magnetic element 79 are rollers 81 with the surface of the rollers extending slightly beyond the lower surface of the rails so that a sheet magnetically held against the rails may be easily shifted axially along the rollers.

In keeping with this aspect of the present invention, provision is made for shifting the sheet magnetically held to the rails 72 axially (to the right as viewed in FIG. 5) so as to place the removed sheet in a first nest, generally indicated at 80, located in the front of the machine. To accomplish this, a pair of reciprocating plunger members 82 guide in runners 82a mounted to the crown 25 and parallel to the magnetic rails 72 are provided with pivotally mounted dogs 84 at the outer ends of the plungers 82 for engaging the trailing edge of the sheet to move the magnetically held sheet 49' to the right as viewed in FIG. 4 on the forward stroke of the plunger member 82. The dogs are pivotally mounted so that on the return stroke of the plunger when a succeeding sheet is magnetically held on the rails, the dog will retract within the plunger thereby avoiding dislodgement or pushing of the succeeding sheet during the return stroke and for eliminating any need to provide exact timing between the plunger and pick-ups movements.

While the plungers may be reciprocatingly operated in timed sequence by any suitable mechanism, we prefer to connect the ends of the members 82 to the reciprocating arm of a loading arm trolley 86, shown in phantom in FIGS. 1 and 5, as may be conventionally utilized for loading at the inlet of a press or press line, thereby insuring synchronized feeding which will become even more apparent as the discussion proceeds. It will also be appreciated that when the dogs 84 engage the trailing edge of the sheet and begin to pull it along rollers 81, the sheet tends to align itself automatically with the dogs 84.

As the sheet 49' is moved forwardly (to the right as viewed in FIG. 4) it passes between the nips of segmented rollers 90, 91 which are rotated through respective sprockets 92, 93 by chain 94 driven from a motor drive, generally indicated at 95. Disposed above rollers 90 are a plurality of spray heads 96 for coating the rollers with lubricating fluid or the like which is then rolled on to the surface of the sheet to provide lubrication under the action of the press dies. After being pulled through the lubricating rollers, the sheet 49' drops on to first nest 80 where it comes to rest.

Figure 2:
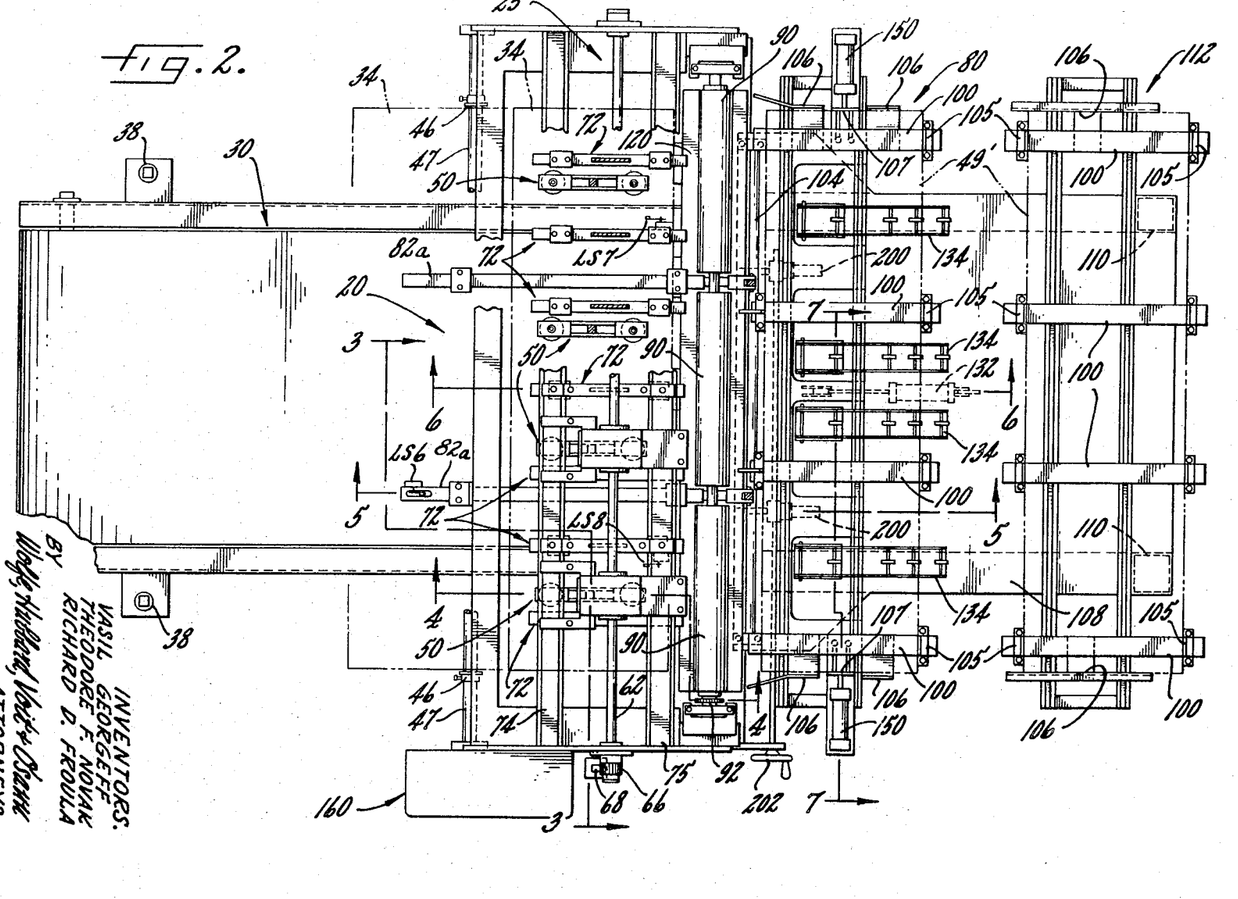
FIG. 2 is a top view of the apparatus shown in FIG. 1, but with the loading arm trolley removed for the purposes of clarity.

The nest 80 comprises a plurality of adjustable spaced slabs 100 supported by a frame 102 which is pivotally mounted to the framework of the machine by a shaft and collar arrangement 104. Upstanding guides 105, 106, and movable guides 107 are provided about the edges of the nest 80 to insure that the sheet dropping onto the nest is retained within the confines of the nest (FIGS. 2 and 5).

Referring to FIG. 1, a horizontally extending bed portion 108 projects outwardly from the front of the machine and is supported by upright columns 110 which may be bolted or otherwise secured to the floor 22 by bolts 111. Stationarily mounted on the upright column 110 is a second nest 112 which may for convenience be of a similar structure to that of nest 80. The second nest 112 is spaced from the first nest 80 by an amount corresponding to the distance between vacuum pick-up heads 114 and 116 of the reciprocating loading arm trolley 86. Thus, the trolley 86 can move in horizontally until head 114 is positioned over a sheet in nest 80 and head 116 will be positioned over nest 112 which as will be apparent will only contain a sheet after the first complete cycle. The trolley 86 is then moved downward until the respective pick-up heads 114, 116 engage sheets in nests 80 and 112. At this point, the trolley moves upwardly to clear the nests and then is moved horizontally to the right, as viewed in FIG. 1, so that pick-up head 114 is disposed above nest 112 and pick-up head 116 is disposed over the press conveyor or possibly a press work station. The trolley may then be lowered to deposit the sheet removed from nest 80 into nest 112 and the sheet removed from nest 112 into a work station or further transfer device. The cycle of operation of the trolley 86 as described repeats itself for each subsequent sheet deposited in nest 80 by the machine.

In accordance with still another of the aspects of the present invention, provision is made for rejecting a "double sheet" which insures that only one sheet at a time is retained in the first nest for pick-up by the loading arm trolley 86 and subsequent placement into the second nest 112, and so on. To this end, referring to FIG. 6, immediately preceding entry between rollers 90, 91, the sheet passes over a horizontal guide 120. Disposed above the guide 120 is a vertically shiftable actuator bar 122 having a roller at its end adjacent to guide 120 to easily permit the sheet to pass between the guide and the actuator bar 122. The opposite end of the actuator bar 122 engages the lever arm of a limit switch LS4. Actuator bar 122 and limit switch LS4 are so arranged that should bar 122 be lifted by an amount more than the thickness of a single sheet passing over guide 20, limit switch LS4 actuates a circuit to institute operation of the machine double blank rejection apparatus.

Figures 6, 7:
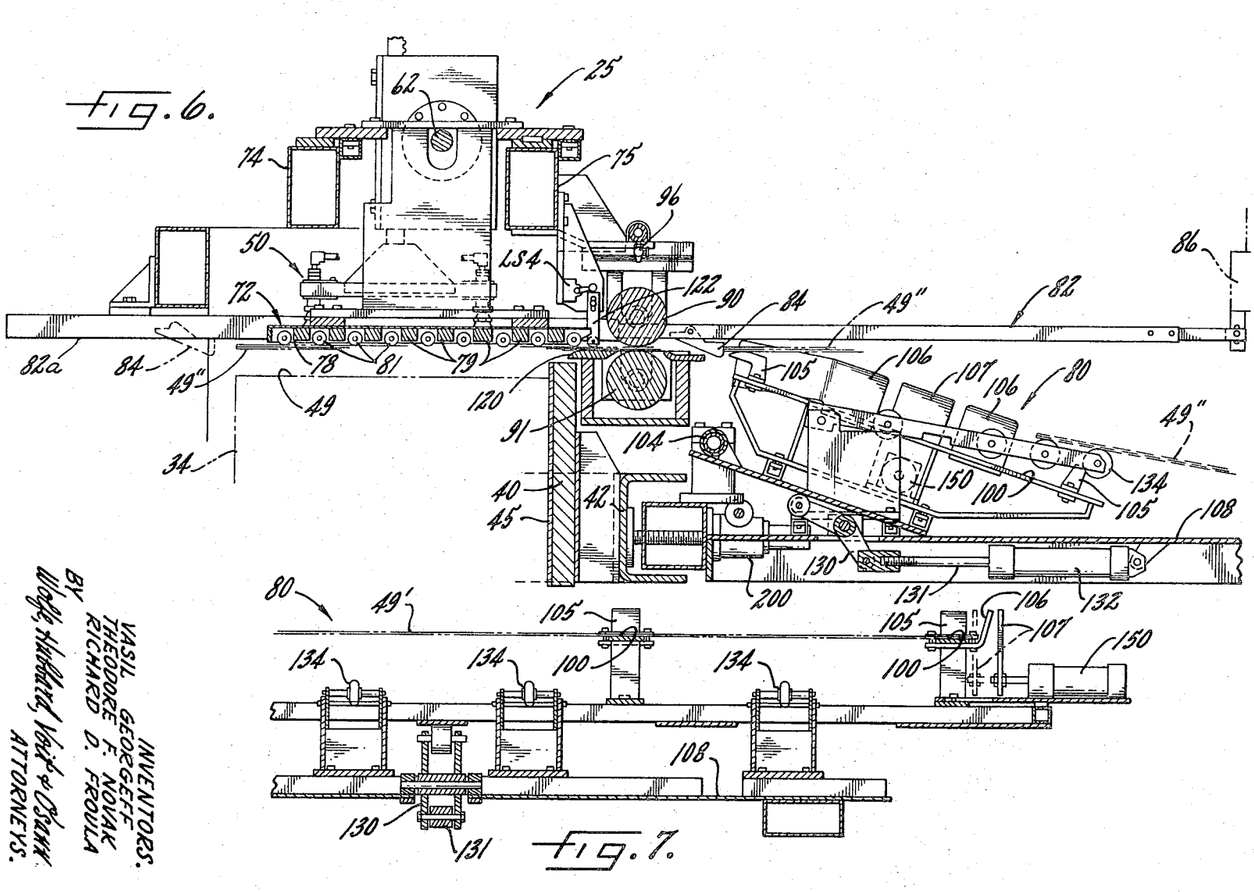
FIG. 6 is a fragmentary sectional view taken substantially along the line 6—6 in FIG. 2 but here depicting the operation in rejecting double sheets.
FIG. 7 is a fragmentary sectional view taken substantially along the line 7—7 in FIG. 2.

In order to accomplish the rejection of the double sheet 49″, referring to FIGS. 5, 6, and 7, the pivotally mounted first nest 80 is normally held in the upright position by bell crank camming linkage 130 connected to the piston shaft 131 of a servo cylinder 132. Disposed between slabs 100 of nest 80 are inclined roller ramps 134 which are in an out-of-the-way position with respect to the slabs 100 when the nest is in the upright position as shown in FIG. 5. Actuation of the servo cylinder 132 drawing the piston shaft 131 to the right as viewed in FIG. 6, rotates the bell crank 130 counterclockwise thus lowering the nest 80 until roller ramps 134 extend above the slabs 100 with the double sheet resting on the inclined roller ramp 134. The rejected double sheet will roll off the inclined ramp 134 onto bed 108, from which the sheets can be retrieved from time to time for refeeding.

In carrying out another of the aspects of the present invention, sensing means are provided for continuous and automatic operation of the apparatus with only a minimum of operator maintenance being required. For the purpose of stopping the conveyor 30 when a stack is in position and for detecting when the last sheet in a stack has been picked up for again advancing the conveyor, a limit switch LS9 (FIG. 5) is provided. Switch LS9 is operated by a pivoted lever 140 mounted adjacent stop block 40 so that the lower edge 142 of the lever clears pallet 36, but the limit switch LS9 will be actuated so long as the leading edge of a sheet bears against the lever 140.

In order to detect when the top sheet is on the cups 52 and to cease downward movement of the pickups 50, limit switch LS2 (FIG. 4) is provided attached to one of the pickup arms 54 with a switch actuator arm 144 that is actuated by contact with the top sheet of the stack. The limit of the upward travel of the pickups is determined by a limit switch LS1 (FIG. 1) operated by a projecting arm 146 attached to reciprocating drive rack 68.

For the purpose of sensing whether the sheet has cleared the pick-up heads and passed on in an aligning position; limit switches LS7 and LS8 (FIG. 2) are provided attached to magnetic rails 72. Referring to FIGS. 2 and 6, conjointly, limit switch LS6 is provided to sense the end of the return stroke of reciprocating plungers 82, and to operate the nest 80 centering guides 107.

In order to straighten a sheet dropped into nest 80 and to center the sheet in the nest, guide plates 107 (FIG. 2) are connected to reciprocating servo cylinders 150 which move the plates 107 inwardly thereby recentering sheet 49′ in the nest 80 (FIG. 7).

For the purpose of determining when the double sheet rejection bin is filled, limit switch LS5 (FIG. 1) is located beneath nest 112 so that the switch is actuated when the collection area becomes filled. Empty pallet collecting cart 44 engages a limit switch LS3 (FIG. 1) when it is in position thereby avoiding moving an empty pallet through the machine when the cart is not in position.

Figure 8:
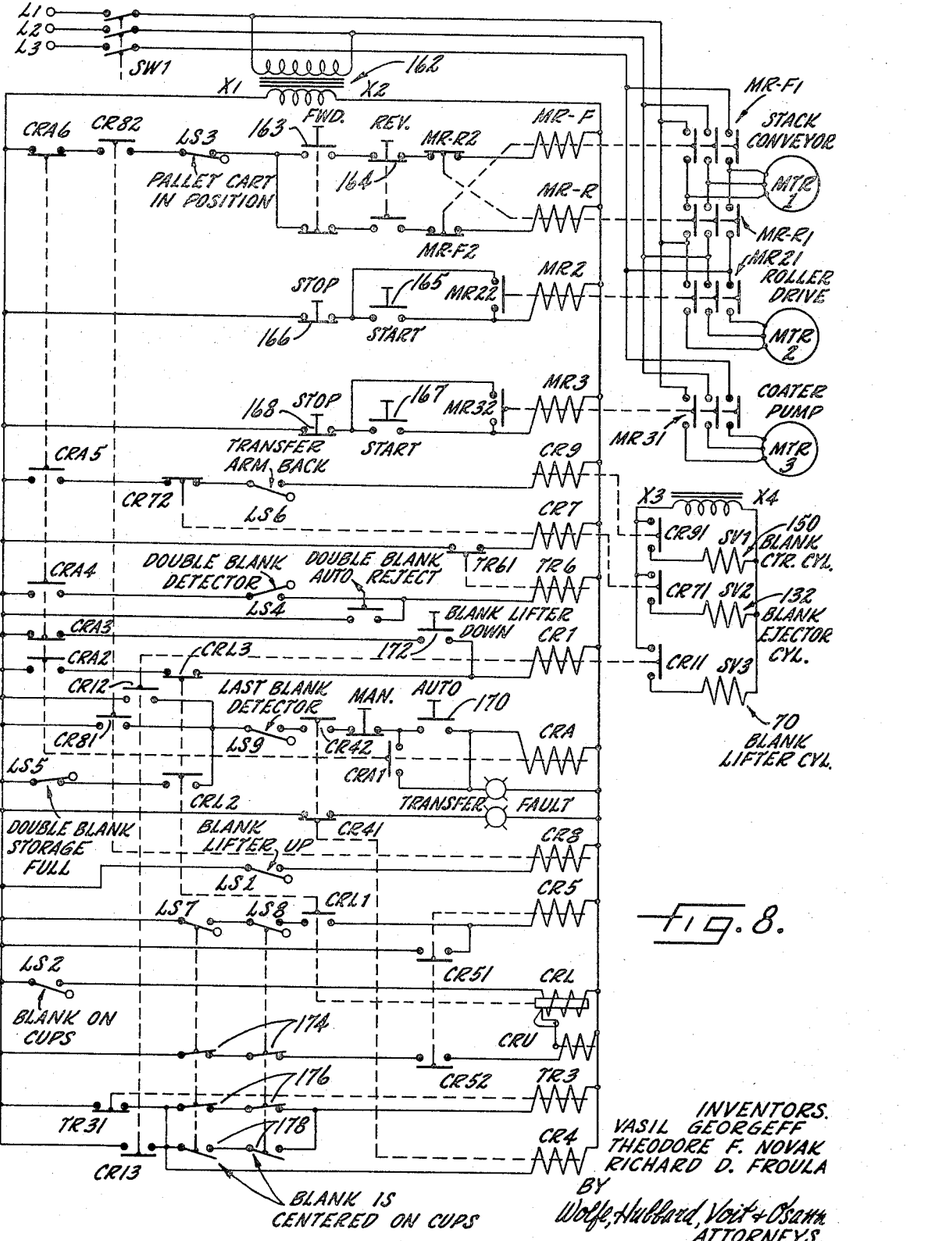
FIG. 8 is a circuit diagram of a control arrangement for operating the apparatus of the present invention.

Having in mind the foregoing structural details, a brief description of a typical destacking and feeding operation will serve to facilitate an understanding of the present invention. To this end, reference is first made to FIG. 1 wherein the apparatus is shown with each of the components in position for beginning the destacking operation. A control panel or station indicated at 160, including a control circuit to be described in some detail is mounted to columns 24 of the frame and includes suitable push-buttons and operation indicating lights whereby an operator can select the desired mode of operation and visually ascertain whether the machine is functioning in the proper manner. Referring to FIG. 8, the control panel 160 is powered from three phase power lines L1, L2, L3, and an interlock switch SW1 is provided on the door of the control panel for safety purposes. The three inputs are connected through appropriate switch contacts to motor M1 for the conveyor 30, motor M2 for the roller 90, 91 drive and motor M3 for the lubricant pump. The control circuit for the machine is operated through a step-down transformer 162 taken off of leads L1, L2 of the input power lines.

The secondary winding of transformer 162 connects to main bus lines X1, X2 from which power is taken to control the circuit elements. The control panel 160 includes forward and reverse push-buttons 163, 164, respectively, which operate respective magnetic relays MR–F, MR–R and contacts MR–F1, MR–F2 and MR–R1, MR–R2 to select the forward and reverse directions of the conveyor 30. Start and stop push-buttons 165, 166, respectively, are provided to operate the roller drive motor through relay MR–2 and relay contacts MR–21 and MR–22. Similarly, start and stop push-buttons 167, 168, respectively, are provided to operate the coater pump motor through magnetic relay MR–3 and its contacts MR–31 and MR–32.

To institute the operation of the machine, push-button 163 to set the forward direction of the conveyor, start button 165 to initiate the roller drive and start button 167 to initiate the coater pump are depressed. With a pallet 36 containing a stack of sheets 34 loaded on the conveyor, and when the pallet receiving cart 44 is in position, limit switch LS3 is closed and the vacuum pick-ups 50 are in the extreme upward position LS1 is closed thus energizing relay CR–8 which closes contact CR–82. Since the forward selector switch 163 has been depressed, the conveyor will begin to move forward carrying the palletized stack until it is positioned against stop blocks 40 beneath the vacuum pick-ups and limit switch LS9 is closed. Assuming that the automatic mode of operation has been selected by depressing push-button 170, relay CRA is energized to close contacts CRA–1, CRA–2, CRA–4, and CRA–5. Contacts CRA–3 and CRA–6 are opened, the latter contact causing the conveyor 30 to stop. Contact CRA–2 causes energization of relay CR–1 closing contact CR–11 which activates the vacuum pick-up drive cylinder 70 causing the vacuum pick-ups to descend towards the stack.

At this point the vacuum pick-ups 50 will descend downwardly until the cups 50 are seated on the blank and limit switch LS2 closes energizing relay CRL which in turn closes contacts CRL–1 and CRL–2 while opening contact CRL–3, the latter contact thereby de-energizing relay CR–1 to open contact CR–11 and stopping the drive cylinder 70. Limit switch 172 which is closed when the vacuum pick-ups are in the down position, re-energizes relay CR–1 to close contact CR–11 and cylinder 70 initiates the drive to raise the vacuum pick-ups together with the top sheet towards the crown 25.

When the vacuum pick-ups carrying the sheet move beyond the magnetic rails transducers 59 cut off the suction to the cups and cause the sheet to be held against the rails 72 while releasing the cups 52.

When the blank is released from the cups and has passed the operating arm of switch LS2, the limit switch LS2 is opened. Limit switch LS1 opens as the vacuum pick-ups reach their uppermost position. Limit switches 174, 176, and 178 insure that the blank was properly held on the cups as improper location of the sheet will open or close one of the circuits to relay TR–3 which opens contact TR–31. If the blank is properly held when it engages the rails 72 and passes clear of the cups, both limit switches LS7 and LS8 are closed and relay CR–5 momentarily engerized locks itself in and closes contacts CR–51 and CR–52 which hold relay CR–5 energized and locking relay CRU latches in relay CRL for continuous operation. If the sheet is improperly held and both limit switches are not closed, the pick-up heads do not again move down for another blank until the difficulty is remedied.

With the blank now held to the magnetic rails 72, the reciprocating plungers 82 begin their forward stroke with dogs 84 engaging the trailing edge of the sheet and pulling it through lubricating rollers 90, 91 after which the sheet drops into nest 80. If only a single sheet has been picked up, it will pass through the double sheet detector without incidence and with the plungers out of the retracted position, limit switch LS6 is closed so that at the instance of recycling for the next blank pick-up, when relay CRA closes switch CRA–5, relay CR–9 is energized to close contact CR–91 thereby activating the blank centering cylinders 150 for recentering the sheet in the nest 80.

Turning to the operation of the double sheet detector, relay CR–7 connected directly across the bus lines X–1, X–2 through normally closed contact TR–61 is normally energized maintaining contact CR–71 closed so that cylinder 132 through linkage 131 maintains the bell crank 130 in the position shown in FIGS. 1 and 5. Thus, with power on the lines, the nest 80 is normally in the upright position.

Assuming that a double sheet has been picked up by the vacuum pick-up and passed through the double blank detector, limit switch LS4 is closed thereby energizing relay TR6 which in turn opens contact TR–61 to de-energize relay CR–7. With relay CR–7 now de-energized, contact CR–71 opens and with air no longer acting upon the cylinder 132, bell crank 130 is rotated causing the nest 80 to return to the reject position. Relay CR–7, also when de-energized opens contact CR–72 thereby insuring that relay CR–9 is not energized and in turn the centering cylinders 150 do not function when a double sheet rejection occurs.

Limit switch LS5 for detecting when the double blank storage is full is normally closed, however, should the storage become full when the switch LS5 is opened and the circuit to switch LS9 is interrupted before completion of a next cycle. Shutdown will occur until the double blank storage area is cleared.

When the last blank from a palletized stack has been picked up, limit switch LS9 opens and the pick-up transfer cycle does not begin again until the conveyor advances so that a subsequent stack again closes limit switch LS9. The conveyor, however, will be advanced automatically in the continuous mode of operation since completion of the cycle after the last blank is picked up will cause de-energization of relay CRA which returns CRA–6 to the closed position at the closing of limit switch LS1 when the vacuum pick-ups reach the upper position and energizes relay CR–8 which closes contacts CR–82 to restart the conveyor.

It will be apparent that a pallet 36 may contain a number of stacks of workpieces or blanks 34 and in the continuous mode of operation, the apparatus will individually remove sheets from the first stack on the pallet, advance the pallet until the next stack on the pallet is in position for removing the sheets one by one from the second stack and so on until the first pallet is empty. A second pallet on the conveyor then will advance pushing the now emptied pallet through the machine onto cart 44 with the first stack on the second pallet now in position beneath the vacuum pick-ups 50.

When an empty pallet is positioned on cart 44, the operator removes the cart from beneath the bed 108 to unload the empty pallet. To facilitate removal of the cart, there is provided a motor drive 190 which through a chain and sprocket arrangement 192 rotates an axle 194 to drive wheels 195 which are mounted on rails 196 embedded in floor 22. When the cart 44 is driven from beneath the bed 108, limit switch LS3 is opened, thus breaking a circuit to the motor of conveyor 30 to prevent advancement of a second pallet while there is an empty pallet on cart 44. It will be appreciated, however, that while the cart 44 has been shown as being set up for independent operation by an operator, a limit switch can be provided to sense when an empty pallet is in position on the cart and to automatically actuate drive 190 to run the cart from beneath bed 108.

One of the features of the present apparatus is that it is extremely versatile and readily permits effective use with multiple stacks of sheets that may vary in size from other stacks being fed into the apparatus. However, if desired and without departing from the present invention provision is made for easily effecting changeover to readily accommodate sheets which may vary considerably in size, yet insuring proper alignment and centering of the sheets with respect to the vacuum pick-ups and magnetic rails for proper transfer to the first nest. Under such circumstances, referring to FIGS. 2 and 5, screw type jacks 200 are provided for axially moving the stop blocks 40 together with their supporting cross members 42 thereby permitting adjustment of the position where the stack is stopped beneath the crown 25. The jacks 200 comprise screw members 203 welded or otherwise secured to frame member 42 through an abuttment plate 204 with the screw member 203 being driven by suitable worm gears provided on a transverse shaft 201 having an operating wheel 202 outboard of the machine.

Referring to FIG. 4, the vacuum cups 52 may also be adjusted to accommodate sheets of differing widths by varying the spacing between respective cups. To accomplish this, the cups are carried by clamping members 206 mounted on arms 54 so that the spacing between the cups can be adjusted by loosening bolts 207. The magnetic rails 72 may be shifted transversely to vary the spacing between them and provide suitable support for sheets of differing lengths. In addition, as is apparent to one skilled in the art, the slabs 100 of the nest 80 may likewise be shifted to provide adequate support for sheets of differing lengths and similarly, the slabs 100 of nest 112 can be so adjusted. Nest 112 may be moved closer or further away from nest 80 depending upon the type of transfer device being utilized.

While the invention has been discussed in connection with removing sheets from a stack and has particular utility when used in connection with an automatic press line, it will be apparent to one skilled in the art that certain of the features and advantages thereof may be utilized in a more simplified arrangement for destacking and feeding individual workpieces to a press or the like. Where such usage is desired, and the workpiece is not in the form of a sheet, but includes irregular surfaces or projections then lubricating rollers 90, 91 would not be used and the apparatus may merely be provided with lubricating sprays or the like, if necessary, without departing from the present invention.

Moreover, while the invention has been discussed in connection with automation of a line of power presses, it will be apparent that the invention in its broader aspects may be applied with equal benefit to other specific production lines, and, consequently, the term "press line" and "press" may be broadly construed to include analogous means for performing operations on a workpiece or sheet.

We claim as our invention:

1. Apparatus for removing individual metal workpieces from a stack for transferring the workpieces one by one to a press or the like having a transfer mechanism at the input of the press comprising in combination, a frame, a plurality of vertically reciprocating vacuum pick-ups mounted in said frame, conveyor means for positioning a stack of workpieces placed on the conveyor beneath said vacuum pick-ups, means for lowering and raising said pick-ups to lift the topmost workpiece of the stack, a plurality of magnetic rails disposed above the stack for receiving a workpiece raised from the stack by said pick-ups, a first nest for receiving said workpiece removed from the stack and a pair of spaced reciprocating plunger means adapted to be connected to said press transfer mechanism so that when said transfer mechanism removes a workpiece from said first nest and advances the workpiece towards the press input, said plunger moves a subsequent suspended workpiece along said rails for deposit in said first nest.

2. Apparatus as claimed in claim 1 wherein said conveyor positioning means is adapted to receive a plurality of palletized stacks of workpieces and includes means for driving said conveyor to advance a palletized stack of workpieces to said position beneath the vacuum pick-ups and means for stopping said conveyor when a stack is positioned beneath the vacuum pick-ups.

3. Apparatus as claimed in claim 2 including a plurality of horizontally spaced stop blocks secured to said frame for engaging the leading edges of a stack of workpieces so that said stack will be rebounded into squared alignment against the stop blocks and said blocks being spaced vertically with respect to the conveyor to permit said pallet to pass between the stop blocks and the conveyor.

4. Apparatus as claimed in claim 1 wherein said magnetic rails have rollers mounted thereon extending slightly below the lower surface of the rails so that said workpiece magnetically held by the rails is shifted along the rolling surfaces of the rollers.

5. Apparatus as claimed in claim 1 wherein said reciprocating plungers, each have a pivotally mounted dog at one end for engaging the trailing edge of said workpiece for aligning and shifting the workpiece along the rails on the forward stroke of said plungers and said dogs being retracted on the return stroke of said plungers thereby avoiding dislodgement of a subsequent workpiece suspended to said rails.

6. Apparatus as claimed in claim 1 wherein said vacuum pick-ups pass between spaced pairs of rails, and said pick-ups move upwardly sufficiently belond the rails so as to effect dislodgment of the workpiece from the pick-ups whereby the workpiece is magnetically suspended to said rails.

7. Apparatus as claimed in claim 1 wherein each of said vacuum pick-ups includes a horizontally extending arm, a pair of spaced vacuum cups mounted to said arm and means for forming suction at the interface of said cups.

8. Apparatus for removing individual metal sheets from a stack for transferring the sheets one-by-one to a press having a transfer mechanism at the input of the press, comprising in combination a frame, a plurality of vertically reciprocating vacuum pick-ups mounted in said frame, means for lowering and raising said pick-ups to lift the topmost sheet of a stack positioned beneath the pick-ups, a plurality of magnetic rails for receiving a sheet raised from the stack by said pick-ups, a first nest for receiving said sheet removed from the stack, reciprocating plunger means for shifting said sheet along said rails for deposit in said first nest and means connecting said plunger means to said press transfer mechanism so that when said transfer mechanism removes a sheet from said first nest and advances the sheet towards the press input, said plungers shift a subsequent sheet suspended to said rails for deposit in said first nest.

9. Apparatus as claimed in claim 8 including a second nest spaced from said first nest so that said transfer mechanism advances a sheet removed from said first nest into said second nest and simultaneously advances a sheet removed from said second nest to the press input.

10. Apparatus for removing individual metal sheets from a stack for transferring the sheets one by one to a first sheet receiving nest, comprising, in combination, a frame, a plurality of vertically reciprocating pick-ups mounted in said frame, means for lowering and raising said pick-ups to lift the topmost sheet of a stack positioned beneath the pick-ups, support means for receiving a sheet in the horizontal position raised from the stack by said pick-ups, means for shifting said sheet horizontally along said support means for deposit in said nest, control means for operating said apparatus continuously, means disposed in the path through which said sheet is shifted for detecting the presence of more than one sheet thickness, said nest being pivotally mounted to the frame, means for shifting said nest into horizontal and inclined positions, said nest shifting means normally maintaining said nest in the horizontal position, a frame bed for receiving rejected sheets positioned below said first nest and said detecting means associated with said nest shifting means so that when more than one sheet thickness is detected, the latter means is actuated, thereby shifting said nest to said inclined position to deposit said rejected sheets on the frame bed.

11. Apparatus as claimed in claim 10 wherein said nest comprises a plurality of spaced slabs and includes a plurality of inclined rollers disposed between said slabs so that when said nest is shifted to the inclined position a sheet resting on the slabs is placed on to the rollers for rolling on to said bed.

12. Apparatus as claimed in claim 10 including means for sensing when said frame bed has been filled with rejected sheets, said sensing means associated with said control means for discontinuing the operation of the machine until said frame bed has been cleared of rejected sheets.

13. Apparatus as claimed in claim 10 including positioning means comprising a conveyor adapted to receive a plurality of palletized stacks of sheets, means for driving said conveyor to advance a palletized stack of sheets to said position beneath the vacuum pick-ups and sensing means connected to said control means for stopping said conveyor when a stack is positioned beneath the vacuum pick-ups.

14. Apparatus as claimed in claim 13 wherein said sensing means reactuates the conveyor drive subsequent to the pick-up of the last sheet in a stack so that the next stack of sheets is positioned beneath said pick-ups.

15. Apparatus as claimed in claim 13 wherein at least one of said pick-ups includes sensing means for stopping the descent of the pick-ups when they engage the top most sheet of said stack.

16. Apparatus as claimed in claim 10 including sensing means associated with said control means for detecting when the sheet is aligned on said pick-ups.

17. Apparatus as claimed in claim 10 wherein said nest includes a pair of spaced reciprocably actuated guide means disposed on opposite sides of said nest for recentering a sheet deposited in the nest.

18. Apparatus for removing individual metal workpieces from a stack for transferring the workpieces one-by-one to a press or the like, comprising in combination, a frame, a plurality of vertically reciprocating vacuum pick-ups mounted in said frame, means for positioning a stack of workpieces beneath said vacuum pick-ups, means for lowering and raising said pick-ups to lift the top most workpiece of the stack, a plurality of magnetic rails for receiving a workpiece raised from the stack by said pick-ups, a first nest for receiving said workpiece removed from the stack, means for shifting said workpiece along said rails for deposit in said first nest, a plurality of horizontally spaced stop blocks secured to said frame for engaging the leading edges of a stack of workpieces so that said stack will be rebounded into squared alignment against the stop blocks, said blocks being spaced vertically with respect to the conveyor to permit said pallet to pass between the stop blocks and the conveyor, and at least a pair of said stop blocks including strips of magnetic material mounted in proximity thereto for magnetically attracting the leading edges of said stacked workpieces into horizontal alignment.

19. Apparatus for removing individual sheets from a stack for transferring the sheets one-by-one to a sheet receiving nest, comprising in combination, a frame, a plurality of vertically reciprocating vacuum pick-ups mounted in said frame, means for lowering and raising said pick-ups to lift the top most sheet of a stack positioned beneath said pick-ups, supporting means disposed above the stack for horizontally receiving a sheet raised from the stack by said pick-ups, means for shifting said sheet horizontally for deposit in said nest, control means for operating said apparatus continuously, positioning means comprising a conveyor adapted to receive a plurality of palletized stacks of sheets, means for driving said conveyor to advance a palletized stack of sheets to said position beneath the vacuum pick-ups, sensing means connected to said control means for stopping said conveyor when a stack is positioned beneath the vacuum pick-ups, horizontally spaced stop blocks secured to said frame for engaging the leading edges of a stack of sheets, said blocks being spaced vertically with respect to the conveyor to permit said pallet to pass between said stop blocks and the conveyor, a cart for receiving an empty pallet passed through the machine and sensing means associated with said control means and said cart for stopping advancement of said conveyor when cart is out of position.

References Cited
UNITED STATES PATENTS

| | | | |
|---|---|---|---|
| 2,159,351 | 5/1939 | Burns | 72—43 |
| 2,661,948 | 12/1953 | Montgomery | 198—41 X |
| 2,668,614 | 2/1954 | Lawson | 198—221 |
| 2,746,753 | 5/1956 | Battey | 271—31 |
| 2,895,733 | 7/1959 | Powers | 271—18 |
| 3,208,605 | 9/1965 | Burke | 214—8.5 |
| 3,257,007 | 6/1966 | Raynor | 214—8.5 |
| 3,279,664 | 10/1966 | Lynch | 214—8.5 |
| 3,327,872 | 6/1967 | Madden | 214—8.5 |

HUGO O. SCHULZ, *Primary Examiner.*

G. F. ABRAHAM, *Assistant Examiner.*